3,579,528
2,6-DIHYDROXYTRICHLOROPYRIDINE AND ITS PREPARATION

Robert Neville Haszeldine, "Windyridge," Lyme Road, Disley, Cheshire, England, and William Thain Flowers, 19 Birch Grove, Rusholme, Manchester 14, England
No Drawing. Filed May 22, 1968, Ser. No. 731,273
Claims priority, application Great Britain, June 7, 1967, 26,218/67
Int. Cl. C07d 31/28
U.S. Cl. 260—297    4 Claims

ABSTRACT OF THE DISCLOSURE

The new compound 2,6-dihydroxytrichloropyridine is prepared by reacting 2,6-diaminopyridine with chlorine while in admixture with aqueous mineral acid. The dihydroxytrichloropyridine is useful as a contact herbicide and as a novel intermediate in the preparation of pentachloropyridine.

---

This invention relates to the new compound 2,6-dihydroxytrichloropyridine, its method of preparation and its conversion to the known compound pentachloropyridine.

In accordance with this invention, 2,6-diaminopyridine, a readily available material, is reacted with chlorine while in admixture with aqueous mineral acid to produce the novel compound 2,6-dihydroxytrichloropyridine.

The reaction can be depicted as:

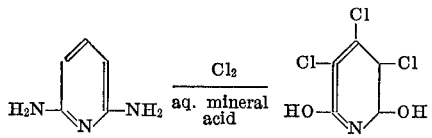

The reaction is conveniently carried out by bubbling gaseous chlorine through a mixture of 2,6-diaminopyridine in aqueous mineral acid while preferably refluxing at about 100° C. However, the temperature of the reaction is not critical and may be carried out at anything from room temperature (i.e., about 25° C.) to 200° C. preferably 80–110° C. Any aqueous mineral acid can be used, for example, sulfuric, phosphoric, nitric, fluoroboric and hydrochloric acid, the latter two being preferred. The amount of mineral acid required in the aqueous reaction mixture is at least an excess over that needed to form the by-product salt with the amino groups of the 2,6-diaminopyridine. The preferred concentration of the aqueous mineral acid is at least about 30%, and more preferred are concentrations of about 40% to about 70%. Reaction time is not critical, though with shorter reaction times (5 hours or less) relatively large amounts of undesired 2,3,4,5-tetrachlorohydroxypyridine are obtained. With longer reaction times, e.g., 10–20 hours, yields of 57% or more of the desired 2,6-dihydroxytrichloropyridine are obtained. The product crystallizes from the aqueous medium at room temperature and is easily recovered from the reaction mixture by filtration or centrifugation.

2,6-dihydroxytrichloropyridine is useful in the agricultural chemicals field as a contact herbicide for undesired plants and vegetation where it has been found to be effective at rates of application as low as 0.1 pound per acre. It has also been discovered that 2,6-dihydroxytrichloropyridine is a novel intermediate in an advantageous process for preparing pentachloropyridine, a widely used compound in the agricultural chemicals field.

Pentachloropyridine has been previously prepared by the reaction of pyridine with phosphorus pentachloride, R. E. Banks et al., J. Chem. Soc., 1965, pp. 594–597. This described reaction involves heating the reaction mixture under pressure, and, since the reaction mixture is extremely corrosive special corrosion resistant equipment, e.g. autoclaves, is required. The procedure is also costly because of the large quantity of expensive phosphorus pentachloride involved. Such procedure is therefore not suitable for the large scale production of pentachloropyridine because it involves complex procedures and apparatus. Other known processes for preparing pentachloropyridine give very low yields, (e.g., 3 or 4%), for instance, such procedures as the vapour phase chlorination of pyridine, the reaction of sulphuryl chloride with pyridine N-oxide, or the reaction of chlorine with pyridine hydrochloride.

We have now discovered a process whereby pentachloropyridine is prepared in high yield, free of the aforesaid disadvantages of the earlier described processes, which comprises reacting 2,6-dihydroxytrichloropyridine with phosphorus pentachloride, preferably in admixture with phosphorus oxychloride. The relative amounts of $PCl_5$ and $POCl_3$ when used in admixture are not critical, nor are the reaction times or temperature. Usually the reaction will be performed by heating the 2,6-dihydroxytrichloropyridine with the $PCl_5$ or $PCl_5/POCl_3$ mixture for from 2–5 hours at a temperature of from 50–200° C. preferably from 80–110° C. The conversion of the 2,6-dihydroxytrichloropyridine to pentachloropyridine is substantially quantitative.

The pentachloropyridine is recovered by conventional techniques, e.g. by distillation in vacuo to remove unreacted $POCl_3$, mixing the solid residue with crushed ice and neutralizing e.g. with ammonium hydroxide. The precipitate obtained is then recrystallized e.g. from methylated spirit or ethanol.

The invention is illustrated and clarified by the following examples:

EXAMPLE 1

A stream of chlorine at a flow rate of 0.05 mole per hour was passed through a solution of 0.1 mole of 2,6-diaminopyridine in 40 ml. of 40% (by weight) aqueous fluoroboric acid at 100° C. in a flask fitted with a reflux condenser.

After 15 hours flow, the solution was allowed to stand at room temperature for 12 hours and 10.6 grams of 2,6-dihydroxytrichloropyridine were precipitated. The crude product was filtered off, washed with sodium bicarbonate solution and with water, recrystallized from chloroform, and sublimed in vacuo to yield 8.0 grams of the substantially pure compound, melting point 111–112° C. Analysis of the product showed it to contain (by weight) 27.9% carbon, 1.1% hydrogen, 6.4% nitrogen and 49.5% chlorine. ($C_5H_2Cl_3NO_2$ requires: 28.0% carbon, 0.9% hydrogen, 6.5% nitrogen and 49.7 chlorine).

The entire product was then heated with 0.19 mole of phosphorus pentachloride and 0.26 mole of phosphorus oxychloride at 100° C. for 2 hours. The phosphorus oxychloride was removed by distillation in vacuo and the resultant solid residue added in small portions to crushed ice and neutralized with ammonium hydroxide solution. The precipitate was recrystallized from methylated spirit to yield 8.4 grams of substantially pure pentachloropyridine in the form of colourless plates, melting point 125–126° C. Analysis of the product showed it to contain (by weight) 23.9 carbon, less than 0.1% hydrogen, 5.4% nitrogen and 70.6% chlorine. ($C_5Cl_5N$ requires 23.8% carbon, 5.5% nitrogen and 70.7% chlorine).

EXAMPLE 2

A stream of chlorine at a flow-rate of 0.1 mole per hour was passed through a solution of 0.46 mole of 2,6-diaminopyridine in 400 ml. of concentrated aqueous hydrochloric acid (d. 1. 19) at 100° C. in a flask fitted with a reflux condenser.

After 17 hours flow, the solution was allowed to stand at room temperature for 12 hours and the precipitated 2,6-dihydroxytrichloropyridine filtered off, washed with water, and dried in vacuo over sodium hydroxide pellets.

The entire crude product was then heated with 1.5 moles of phosphorus pentachloride and 1.9 moles of phosphorus oxychloride at 100° C. for 3 hours. The phosphorus oxychloride was removed by distillation in vacuo, and the resultant solid residue added in small portions to crushed ice. The solution was neutralized with ammonium hydroxide solution and the precipitate recrystallized from ethanol with the addition of charcoal to yield 59 grams of substantially pure pentachloropyridine.

We claim:

1. The method of preparing 2,6-dihydroxytrichloropyridine which comprises reacting gaseous chlorine with 2,6-diaminopyridine, at a temperature within the range of about 25° C. to 200° C., in admixture with aqueous mineral acid selected from the group consisting of sulfuric acid, phosphoric acid, nitric acid, fluoboric acid and hydrochloric acid in an amount in exess of that stoichiometrially required to form a by-product salt with the amino groups of said 2,6-diaminopyridine reactant.

2. The method of claim 1 wherein the reaction temperature is 80 to 110° C.

3. The method of claim 2 wherein the aqueous mineral acid is aqueous hydrochloric acid.

4. The method of claim 2 wherein the aqueous mineral acid is aqueous fluoroboric acid.

References Cited

Sadler: Chem Abstracts, vol. 55, cols. 18, 767–69, 1961.

Itlingsberg: Pyridine and Derivatives, part 3, Interscience, pp. 81, 1962, QD 401 IT5 C–2.

ALAN T. ROTMAN, Primary Examiner

U.S. Cl. X.R.

260—296; 71—94